(12) United States Patent
Baroty et al.

(10) Patent No.: US 7,330,249 B2
(45) Date of Patent: Feb. 12, 2008

(54) QUALIFICATION OF A MASK

(75) Inventors: Avishai Baroty, Hod-Hasharon (IL); Gadi Greenberg, Tel-Aviv (IL); Chaim Braude, Nes-Ziona (IL)

(73) Assignee: Applied Materials, Israel, Ltd., Rehovot (IL)

( * ) Notice: Subject to any disclaimer, the term of this patent is extended or adjusted under 35 U.S.C. 154(b) by 0 days.

(21) Appl. No.: 11/554,309

(22) Filed: Oct. 30, 2006

(65) Prior Publication Data

US 2007/0127017 A1   Jun. 7, 2007

(51) Int. Cl.
*G01N 21/00* (2006.01)

(52) U.S. Cl. ................................ 356/237.4; 356/237.5

(58) Field of Classification Search .. 356/237.1–237.5, 356/394; 250/548; 355/53, 67, 71
See application file for complete search history.

(56) References Cited

U.S. PATENT DOCUMENTS

| 5,477,057 A * | 12/1995 | Angeley et al. ............ 250/548 |
| 6,590,637 B2 * | 7/2003 | Nishi ........................... 355/53 |
| 6,757,645 B2 | 6/2004 | Chang et al. |
| 2003/0132382 A1 * | 7/2003 | Sogard ........................ 250/311 |
| 2004/0243320 A1 | 12/2004 | Chang et al. |

OTHER PUBLICATIONS

Zibold, et al., "Aerial Image Measurement Technique for Automated Reticle Defect Disposition (ARDD) in Wafer fabs", Proceedings of SPIE, 2004, pp. 1-9.

* cited by examiner

*Primary Examiner*—Hoa Q. Pham
(74) *Attorney, Agent, or Firm*—Tarek N. Fahmi

(57) ABSTRACT

A method for qualifying printability of a mask, including performing a first inspection of the mask with an optical assembly at a first numerical aperture of collection (NAC) of radiation from the mask, and determining, in response to the first inspection, a first possible defect in the mask and a first location of the first possible defect. The method also includes performing a second inspection of the mask with the optical assembly at a second NAC of radiation from the mask, different from the first NAC, and determining, in response thereto, a second possible defect in the mask and a second location of the second possible defect. The method further includes performing a comparison of the first and second locations, and in response to the comparison, determining that the first and second possible defects represent a real defect if the first location matches the second location.

24 Claims, 3 Drawing Sheets

QUALIFICATION OF A MASK

FIELD OF THE INVENTION

The present invention relates generally to inspection of a surface, and particularly to inspection of a mask used in semiconductor fabrication.

BACKGROUND OF THE INVENTION

As the fabrication process for semiconductors continues to increase the density of elements produced on the semiconductor, masks that are used in the process increase in complexity and the sizes of elements of the mask decrease. After production, and before being used, a mask needs to be inspected to ensure that it is within acceptable limits. The decrease in element size, typically to sizes below the diffraction limit of optical inspection apparatus, complicates the inspection process. The introduction of mask error enhancement factors, to compensate for the decrease below the diffraction limit, further complicates the inspection process. A number of methods for inspecting masks are known in the art.

Carl Zeiss Microelectronic Systems, of Jena, Germany, produce an "AIMS™ fab" aerial imaging system for optically inspecting masks. The system is stated to emulate the stepper/scanner under equivalent optical conditions. The system includes automated control for its numerical aperture, which is able to vary in the ranges from 0.3-0.76.

U.S. Pat. No. 6,757,645 to Chang et al., whose disclosure is incorporated herein by reference, describes a method and apparatus for inspecting a photolithography mask. The apparatus generates a first and a second simulated image of a defect area image. The method compares the first and second simulated images in order to determine the printability of an identified potential defect on the photolithography mask.

SUMMARY OF THE INVENTION

In embodiments of the present invention, a mask, also herein termed a reticle, is qualified by being inspected in an inspection station comprising an optical assembly. The qualification distinguishes real defects in the mask from "nuisance" defects, i.e., defects which are apparent rather than real. The optical assembly inspects the complete mask with two different optical processes. An aerial imaging process uses a numerical aperture (NA) for illumination of the reticle, and an NA for collection of radiation from the reticle, that emulate those used when the reticle is used to photolithograph a wafer. A higher NA process sets the value of the NA for collection to be higher than that of the aerial imaging process. The NA for collection of the aerial imaging process is typically approximately 0.2, the NA for collection for the higher NA process is typically approximately 0.8.

The inspection time for the aerial imaging process is typically significantly less than the inspection time for the higher NA process. For each process an inspection station processor analyzes the image of the complete mask to determine possible defects, and respective locations of the possible defects. The processor compares the sets of locations produced by the two inspections. For each location match found in the two inspections, the possible defect determined at the location is assumed to be a real defect. By inspecting the complete mask using the two different processes to find matching locations of possible defects, embodiments of the present invention are able to distinguish real defects from nuisance defects. The comparison of the sets of locations also acts as a pre-filter for the possible defects and following analysis, and significantly reduces the interaction with the inspection process required by an operator controlling the inspection station. Because of the reduced interaction, the inspection process is able to evaluate the whole mask, comprising of the order of 500 Gpixels, unlike other inspection systems known in the art.

If, after the pre-filtering described above, only the higher NA process indicates a possible defect at a given location, the operator controlling the station reviews the image from the aerial imaging process at the given location to classify the possible defect. The operator typically uses critical dimension (CD) data as a printability criterion to determine if the possible defect is a real defect or a nuisance defect. Since the image being reviewed by the operator is localized at the higher NA location, the operator may advantageously set CD thresholds to be lower than those that would normally be set if only the aerial image is examined. The CD thresholds that would normally be set are a function of the signal/noise ratio of the inspection station, which is determined by the size of the NA for collection for the aerial imaging process.

In one embodiment, the higher NA inspection is performed first, and attributes and locations of the possible defects are saved. The aerial imaging inspection process is then performed. At locations where the aerial imaging inspection process does not find a matching possible defect, the operator uses the aerial image and the attributes to classify the defect.

In an alternate embodiment the aerial imaging process is performed first. Defect locations and a complete image of the mask are saved for this process. The higher NA inspection is then performed, and for locations where only a high NA possible defect is found, the operator uses the saved aerial image to classify the possible defect. The classification may be performed in real time.

In some embodiments, at least one of the inspections comprises a learning process. As decisions are made by the operator as to which possible defects are real defects, the attributes of these defects found in the high NA inspection are saved. The inspection processor uses the saved attributes to classify other possible defects as real or nuisance defects, and thus increases the amount of pre-filtering performed before the operator is required to interact with the system.

The present invention will be more fully understood from the following detailed description of the embodiments thereof, taken together with the drawings in which:

DETAILED DESCRIPTION OF EMBODIMENTS

Figure 1:
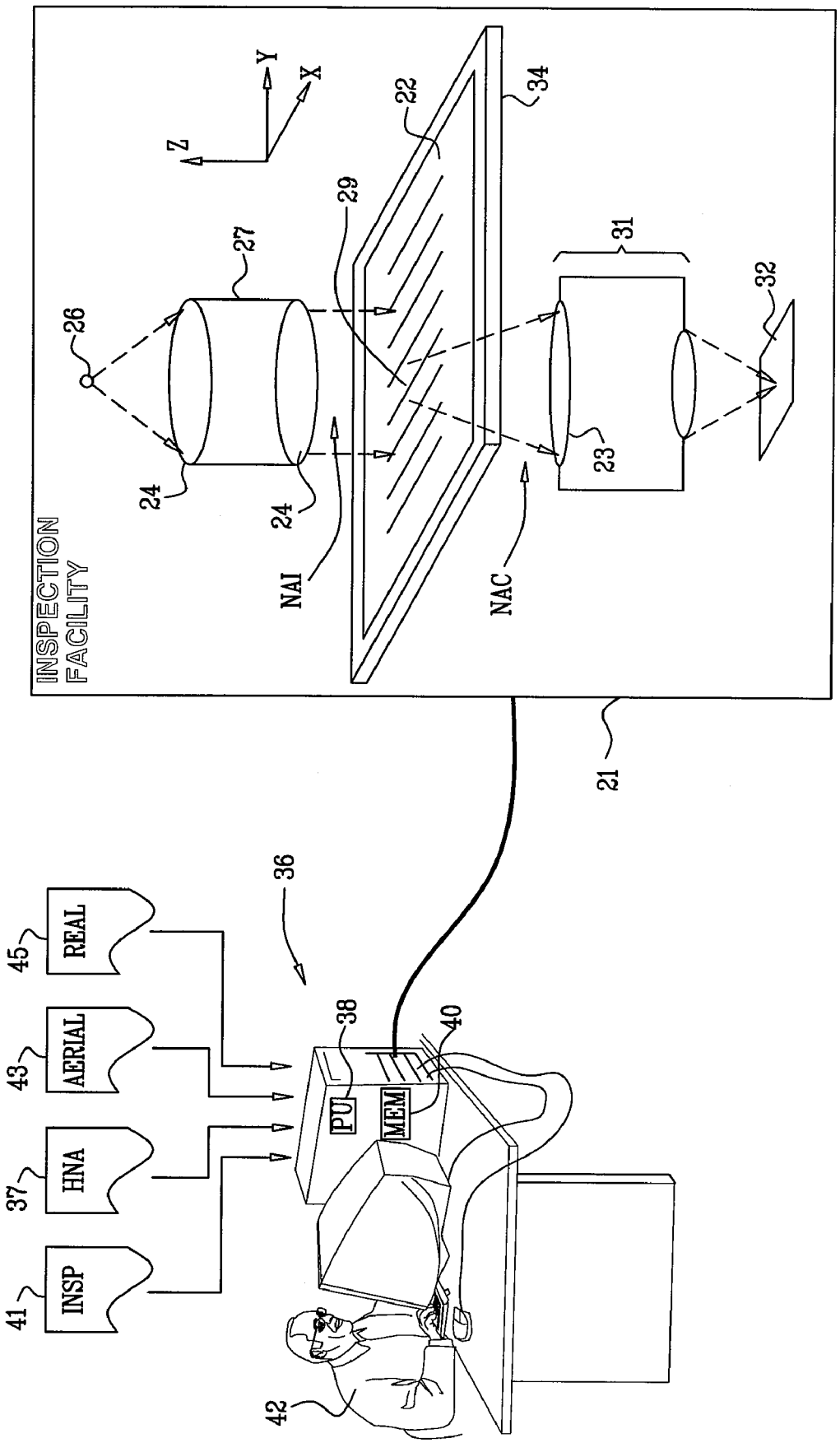
FIG. 1 is a schematic diagram of an inspection station, according to an embodiment of the present invention.

In embodiments of the present invention, a mask, also termed a reticle, is qualified by analyzing the complete mask using two related but different optical inspection processes. The qualified mask is typically used in fabrication of a semiconductor wafer. The inspection processes described herein may be applied when a mask is first produced, or at a later stage in the life cycle of the mask, so as to verify that the whole of the mask remains qualified.

The mask itself is generally produced by electron-beam lithography of a metallic film such as chromium on a transparent substrate such as fused silica. Alternatively or additionally, the mask may comprise phase elements incorporated into the transparent substrate, by a process such as etching the substrate.

The completed qualified mask is imaged onto the wafer surface, by a stepping and/or a step and scan procedure, typically using a reduction ratio of 4:1. The stepping procedure forms multiple images of the mask on the wafer.

To maintain the integrity of the qualified mask, it is normally enclosed in a sealed enclosure. The enclosure has upper and lower pellicles which are transparent to the radiation used to image the mask onto the wafer, and which prevent particulate matter from coming into contact with the mask. Notwithstanding safety precautions such as these, the complexity of modern masks, together with the small dimensions of the mask elements and concomitant features such as optical proximity corrections (OPCs), lead to differences being formed from the theoretical image of the mask. Since the mask is imaged many times onto the surface of the wafer, any such differences may also be replicated many times.

In order to qualify the mask, it is inspected by the two processes described herein to detect the differences, and the detected differences may be classified as defects. Typically, there are one or more pre-set attributes involved in determining if any particular differences are to be classified as a defect. For example, a rectangular region of 2×5 pixels, each of the pixels having a theoretical gray level of 255, may actually be detected as 8 pixels having gray levels in a range 240-255, and two pixels with gray levels which are in a range from 230-239. Depending on settings of the inspection system, e.g., an acceptable number of pixels having a gray level less than a given value, the detected region may or may not be classified as a defect. In this example, the pre-set attributes are the acceptable number of pixels, and the given value of the gray level. It will be appreciated that both the value of the acceptable number, and the given gray level value, determine the sensitivity of the inspection. Low values of both the acceptable number and the gray level ensure that there is a low probability of missing a real defect. However, such low values automatically enlarge the numbers of false defects detected. False defects, also herein termed nuisance defects, and real defects are described further below. Typically, the attributes of the inspection process are set by an inspection operator according to a fraction of false defects that the operator is prepared to accept.

A real defect is one which prints on the wafer to form a region that is outside the specification of the wafer. A defect which gives a printed result that is not outside the specification of the wafer is termed a nuisance defect. Thus, it is how well the defect prints, herein termed the printability of the defect, that is important.

A guide to the printability of a given defect onto the wafer may be changes in one or more critical dimensions (CDs), measured at the mask, that are associated with the defect. For example, if the defective element is a line, a CD associated with the line may be a line width of 100 nm. In a typical all mask inspection, a threshold value of a change of CD ($\Delta$CD) may be set at 10% of this value, so that a line width between 90 nm and 110 nm is assumed not to affect the printability, whereas a line width of 120 nm is assumed to affect the printability. Similar criteria for determining printability may be set for other elements of a mask, such as a circular contact, where a CD associated with the contact may be the contact diameter. The threshold value for the CD may be set by an inspection operator to achieve the acceptable level of false defects.

The quality of the image generated by an inspection process, i.e., the image signal/noise ratio (SNR), influences the printability criterion that may be effectively applied. The image SNR for a low numerical aperture (NA) inspection process is lower than that of a high NA inspection process. Either process may detect relatively large defects, and allow them to be classified as real or nuisance defects, since noise is not a concern. However, smaller defects are more problematic, since these defects may be masked by the noise level. Thus, to avoid the masking effects of noise, an acceptable printability criterion appropriate to the lower NA is higher than one appropriate to the higher NA, if the two processes are applied independently. A higher NA inspection detects most real defects, but leads to too many nuisance defects being identified with the real defects. Separation of the nuisance defects from the real defects is time consuming. While a lower NA inspection may be performed in less time than a higher NA, it will be understood that an independent application of a lower NA inspection, giving an acceptable fraction of nuisance defects, will miss some real defects, especially smaller defects.

The two different but related inspection processes performed by embodiments of the present invention allow an operator of the processes to qualify the printability of the mask by differentiating between nuisance and real defects, and to apply high NA inspection criteria without increasing the number of nuisance defects. As described in more detail below, the two processes apply a pre-filtering technique to identify some of the real defects, and remove these identified defects from those needing to be classified by a system operator. Since some of the defects have been removed, high NA criteria may be applied on the defects that the operator needs to analyze, without increasing the time for the overall analysis of a mask. The savings in time generated by embodiments of the present invention allow a mask of area 10 cm$^2$, having of the order of 500 Gpixels, to be completely inspected.

Reference is now made to FIG. 1, which is a schematic diagram of an inspection station 20, according to an embodiment of the present invention. Station 20 comprises an optical inspection facility 21 which is configured to be able to function at a range of different NAs of collection (NACs) for an imaging optical assembly 31 of the facility. Typically, in embodiments of the present invention, the NAC of the imaging optical assembly may be set in a range from approximately 0.2 to approximately 0.8. Station 20 also comprises a workstation 36, which is typically an industry standard computer having a processing unit (PU) 38 and a memory 40. Inspection software 41, having properties described below, is typically stored in memory 40. Files 37, 43, and 45, having functions described below, are also stored in memory 40. Software 41 can be supplied in electronic form or on tangible media such as a magnetic storage disc or a compact disc which are readable by a computer, or other means known in the art for permanent storage of electronic data. Station 20 is controlled by an inspection operator 42.

Facility 21 comprises a radiation source 26, typically a pulsed excimer laser which radiates at ultra-violet (UV) wavelengths of the order of 200 nm. The radiation from source 26 is focused via illumination optics 27 to a region 29 on a mask 22. Illumination optics 27 are shown schematically in FIG. 1 as including focusing lenses 24, but it will be understood that optics 27 typically comprise other optical elements that focus the radiation onto mask 22. The NA of illumination optics 27 (NAI), as well as the configuration of the illumination optics, is set via workstation 36 by operator 42, as described below with reference to FIGS. 2 and 3. Mask 22 is mounted on a motion stage 34, which is under control of the workstation, and which is able to move the mask in x-, y-, and z-directions.

Transmitted radiation from region 29 is collected by imaging optical assembly 31, which includes an objective lens 23. The imaging optical assembly focuses the returning radiation to an imaging array 32, which is typically a charge coupled device (CCD) array. In operating facility 21, operator 42 scans mask 22, using stage 34, so that all of the mask is irradiated by the radiation from source 26. Signals from imaging array 32 are transferred to workstation 36, which analyzes the signals, under control of the operator, as described in more detail below.

Figure 2:
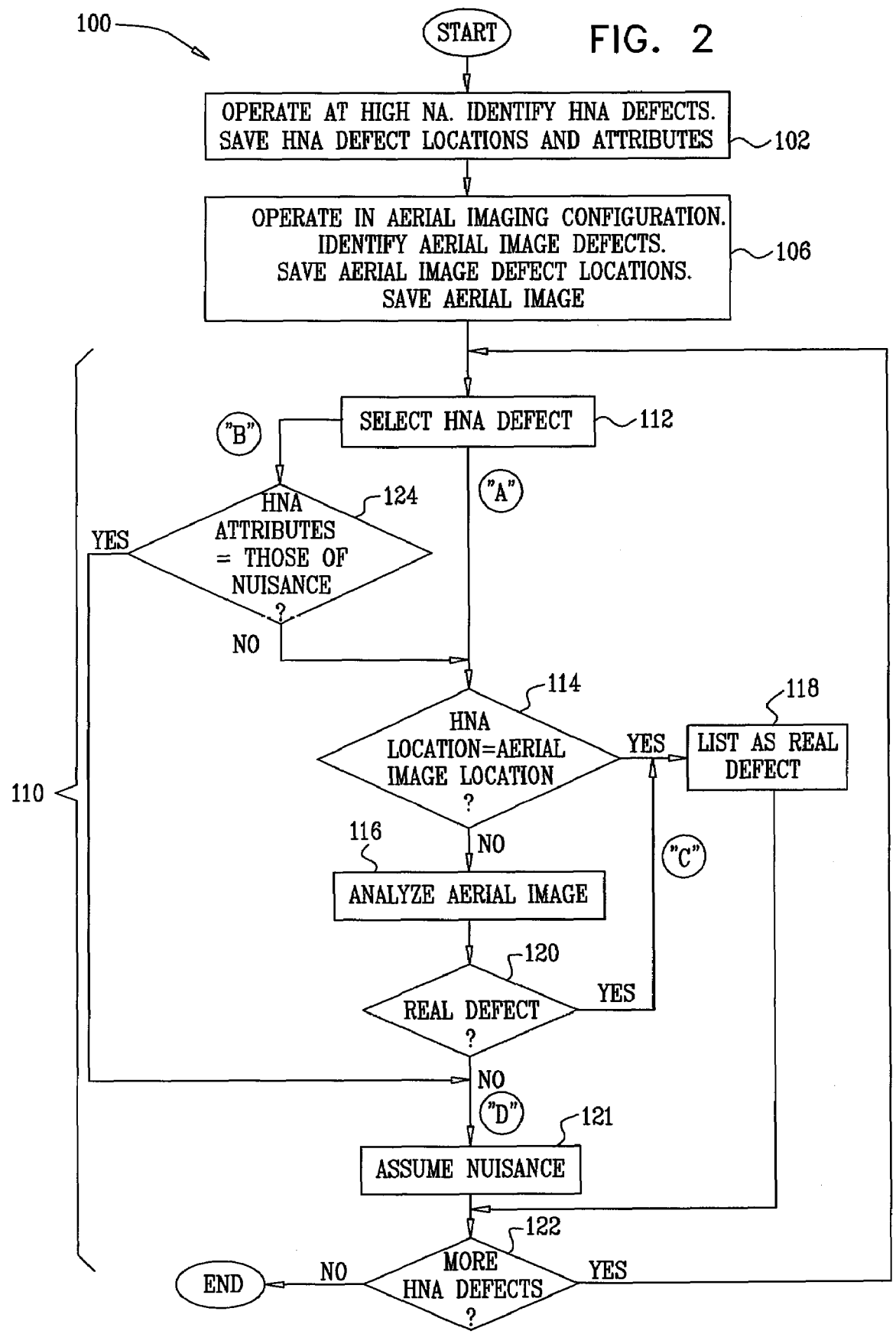
FIG. 2 is a flowchart of steps performed by the station of FIG. 1, according to an embodiment of the present invention.

FIG. 2 is a flowchart 100 of steps performed by station 20, according to an embodiment of the present invention. In a first step 102, operator 42 operates NAC of imaging optics 31 at a high NA (HNA), for example NAC is set to be approximately equal to 0.75. The operator also sets NAI to be substantially the same as that used in a second step 106, described below. NAI is typically approximately 0.07. The inspection operator operates stage 34 to scan the whole of mask 22, so as to identify possible defects by analysis of the signals generated by array 32 as the mask is scanned. Possible defects detected in step 102 are also herein termed alerts or HNA alerts. The analysis typically uses comparison of the signals with a database of design data, and/or in a die-to-die comparison, wherein signals from corresponding regions of the mask are compared with each other. The comparison, typically performed as a combination of an automatic operation by PU 38 and an interactive operation between the inspection operator and facility 21 via the workstation, generates a set of HNA alerts for the mask.

The set of HNA alerts comprises a location of the center of mass of each alert, together with associated attributes describing characteristics of the alert. Such attributes include a size of the alert, whether the alert is an intrusion or a protrusion, an average gray level of the alert and/or its relationship to the gray level of the region surrounding the alert, and a type of neighborhood for the alert, such as a line, a corner, and/or a no-pattern region. PU 38 stores the set of HNA alerts, including their attributes, as file 37 (FIG. 1) in memory 40.

Defects detected by the station in step 102 do not necessarily translate into a reduction in printability of the mask. As described above, the printed result produced by the mask determines the printability of the mask. Typically, the HNA alerts detected in step 102 comprise a relatively large number of nuisance defects, i.e., HNA alerts which do not affect the printability of mask 22.

In second step 106, the operator operates imaging optics 31 in an aerial imaging configuration. Thus, if mask 22 is intended to be printed on a wafer at an NA of 0.8, and there is a 4:1 reduction in printing, operator 42 sets the value of NAC to be that used for printing the mask, i.e. NAC is set to be approximately 0.22. Also, the value of NAI is set according to the value of σ, the ratio NAI:NAC, used for printing. Herein it is assumed that σ=0.3, so that NAI is set at approximately 0.07.

The imaging optics are set to focus at one plane of mask 22. In addition, the inspection operator sets parameters of the facility so that the sensitivity to defects is at an acceptable level, for example, the expected percentage of false defects is set to 20%. As for step 102, the inspection operator sets facility 21 to scan the whole of the mask, to identify possible defects. The defects determined in this step are termed low numerical aperture (LNA) or aerial image defects, and PU 38 saves the aerial image defect locations in file 43 (FIG. 1). PU 38 also saves an overall image of the mask, herein termed the aerial image, in file 43.

In a set of steps 110, comprising steps 112, 114, 116, 118, 120, 121, 122, and 124, the locations of the HNA and aerial image defects are compared. In a step 112, an HNA defect is selected. Flowchart 100 then follows path "A" to step 114. In some embodiments of the present invention described further below, flowchart 100 follows path "A" initially, then follows path "B" to step 124.

In a comparison 114, PU 38 compares the location of the HNA defect with the locations of the aerial image defects.

If the location of a given HNA defect coincides with the location of an aerial image defect, then in a step 118 PU 38 records the location as a real defect in a mask results file 45 (FIG. 1).

If there is no aerial image defect having a location coinciding with an HNA defect, then in steps 110, 120, 121, and 122 the HNA defect is analyzed further.

In steps 116 and 120, the HNA defect location is used to inspect the aerial image saved in step 106. The operator controlling facility 20 inspects the aerial image, and decides, typically by applying CD analysis to the aerial image of the HNA defect location, whether or not the defect is a real defect. The threshold value of ΔCD set by the operator for his decision is typically significantly lower than the threshold value that would have been set in an all mask inspection, described above. Thus, for a line element where the threshold value of ΔCD for the all mask inspection is 10%, the operator typically sets ΔCD to be less than 10%. In some embodiments of the present invention, ΔCD may be set to 6%. The operator records the defect as a real defect in file 45 if the CD is above the threshold value. A path "C" in the flowchart is followed if the decision is that the alert is real. A path "D," comprising step 121, is followed if the decision is that the alert is a nuisance. In step 121 PU 38 treats the HNA alert selected in step 112 as a nuisance defect.

In a comparison step 122, PU 38 checks if there are further HNA defects to be analyzed. If there are, flowchart 100 returns to step 112. If there are not, the flowchart ends.

Embodiments where path "B" may be followed incorporate dynamic learning. In these embodiments, in step 112, attributes of the selected HNA defect are temporarily saved in memory 40. If, in succeeding steps 116, and 120, path "D" is followed, then the attributes are maintained in memory 40. Thus, for each HNA defect that is determined to be a nuisance defect via path "D," the attributes of the defect are maintained in memory 40. In the embodiments where path "B" may be followed, PU 38 typically switches from path "A" to path "B" after a preset number of HNA defects have been selected in step 112, and/or after a preset number of HNA defects have been considered to be nuisances by path "D" being followed. The preset number may typically be of the order of 5% of an expected number of HNA defects.

In following path "B," in a step 124, the processing unit compares the attributes of the selected HNA defect with the attributes that are maintained in memory 40. If the attributes are substantially the same, then the selected HNA defect is assumed to be a nuisance defect, and the flowchart continues at step 122. If the attributes are not substantially the same, then the flowchart continues at step 114.

Application of flowchart 100 substantially reduces the number of defects that the inspection operator needs to evaluate to determine if a possible defect is a real defect or a nuisance defect, compared to systems which do not use the steps of the flowchart, by pre-filtering defects before they are presented to the operator.

It will be appreciated that applying dynamic learning by following path "B" may further reduce the number of defects that the inspection operator has to evaluate in step 116.

In an alternative embodiment of the present invention, the implementation of flowchart 100 is substantially as described above, except for the following differences.

Step 106 is performed for more than one focus plane at mask 22. For each plane, aerial image defects, their locations, and the respective aerial images are saved in file 43. In step 114 the comparison is performed for each plane. If the comparison is positive for any one of the planes, the location is listed in step 118 as a real defect. If in step 114 all the comparisons are negative, then the inspection operator performs step 116, the analysis of the aerial image, on all the images saved in step 106, so as to determine in step 120 whether or not the location is a real defect.

Figure 3:
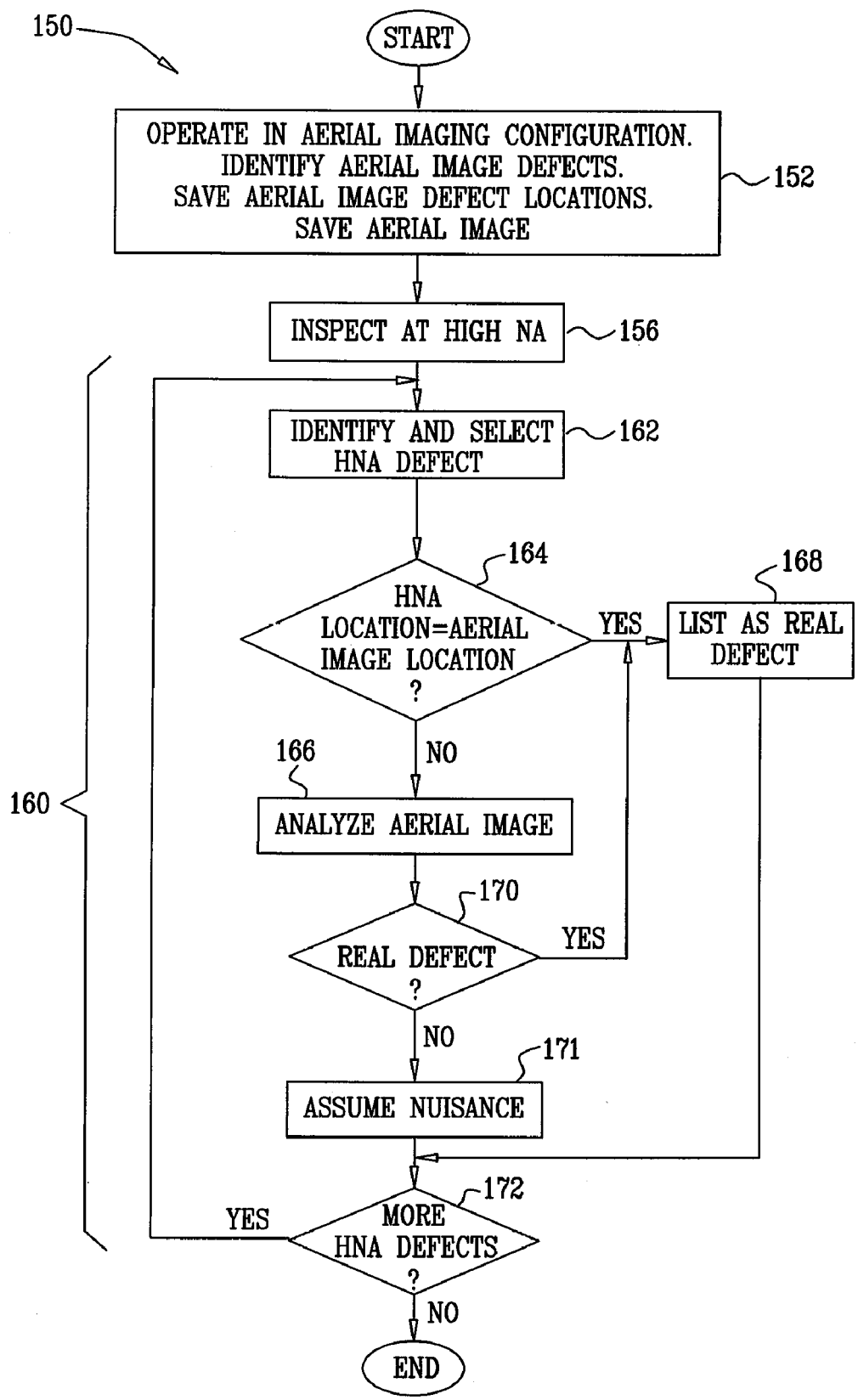
FIG. 3 is a flowchart of steps performed by the station of FIG. 1, according to an alternative embodiment of the present invention.

FIG. 3 is a flowchart 150 of steps performed by station 20, according to a further alternative embodiment of the present invention. A first step 152 comprises actions substantially similar to those of step 106 described above, wherein facility 21 inspects mask 22 at a low numerical aperture, in an aerial imaging configuration. Typically the inspection is performed for one focus plane. Alternatively, the inspection is performed for more than one focus plane. At the conclusion of step 152, the locations of the defects found in the one or more inspections are saved in file 43. For each of the focus planes, the aerial image of the entire mask is also saved in file 43.

In a step 156, the mask is inspected at a high NA, under conditions generally similar to those described above for step 102, i.e., with NAC of imaging optics 31 approximately equal to 0.75. In contrast to step 102, rather than saving the locations of defects, and the attributes of the defects, resulting from the inspection, the following verification steps 160 are performed as each HNA defect is identified. Verification steps 160 comprise steps 162, 164, 166, 168, 170, 171, and 172.

In a step 162 an identified HNA defect is selected.

In a step 164 PU 38 checks the location of the selected HNA defect against the saved locations in file 45. If the locations agree, i.e., if one of the aerial image locations is coincident with the HNA defect location being considered, the location is assumed to have a real defect, and in a step 168 PU 38 records the location of the defect in file 45.

If the location of the HNA defect does not agree with any of the aerial image locations, then in a step 166 the inspection operator analyzes the aerial image or images saved in file 45 at the location of the selected HNA defect. The analysis is typically performed using pre-set printability criteria based on threshold ΔCD values, substantially as described above with respect to steps 116 and 120 (FIG. 2). On the basis of the analysis, the operator, in a comparison 170, decides if the HNA defect is real or not. If the HNA defect is classed as real, its location is recorded in file 45; otherwise, in a step 171, the HNA defect is assumed to be a nuisance defect. Flowchart 150 continues with a comparison 172 wherein PU 38 checks if there are further HNA defects. If there are, steps 160 repeat with another identified HNA defect. Flowchart 150 concludes when all identified HNA defects have been classified in steps 160.

Since flowchart 150 does not require saving relatively large amounts of HNA attributes data in file 37, and consequent delays in referring to the file, it will be understood that operator 42 may apply the steps of flowchart 150 in real time.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for qualifying printability of a mask, comprising:
    performing a first inspection of the mask with an optical assembly at a first numerical aperture of collection (NAC) of radiation from the mask;
    determining, in response to the first inspection, a first possible defect in the mask and a first location of the first possible defect;
    performing a second inspection of the mask with the optical assembly at a second NAC of radiation from the mask, different from the first NAC;
    determining, in response to the second inspection, a second possible defect in the mask and a second location of the second possible defect;
    performing a comparison of the first and second locations; and
    in response to the comparison, determining that the first and second possible defects represent a real defect if the first location matches the second location.

2. The method according to claim 1, and comprising, in response to the comparison, determining that the first and second possible defects represent a nuisance defect if the first location does not match the second location.

3. The method according to claim 1, wherein the second NAC is less than the first NAC, wherein the first location does not match the second location, and wherein performing the second inspection comprises saving an image of the mask, the method further comprising a human operator performing an analysis of the image at the first location and in response to the analysis determining that the first possible defect represents the real defect.

4. The method according to claim 3, wherein performing the analysis comprises performing the analysis in real time.

5. The method according to claim 3, wherein determining the second possible defect comprises determining a plurality of second possible defects, the method further comprising determining an acceptable printability criterion for the mask at the second NAC in response to a noise level determined by the second NAC, so that a given fraction of the second possible defects at the noise level comprise real defects, and wherein performing the analysis comprises applying a printability criterion to the analysis corresponding to a smaller value than the given fraction.

6. The method according to claim 5, wherein the real defect comprises a defect in an element of the mask, and wherein the acceptable printability criterion and the printability criterion comprise respective functions of a critical dimension of the element.

7. The method according to claim 1, wherein the second NAC is less than the first NAC, wherein determining the second possible defect comprises determining a plurality of second possible defects and respective second locations of the plurality, and wherein performing the comparison of the first and second locations comprises performing respective comparisons between the first location and the respective second locations.

8. The method according to claim 1, wherein the first NAC is smaller than the second NAC, wherein determining the second possible defect comprises determining second-possible-defect-attributes thereof, and also comprises determining a plurality of second possible defects and saving as stored-attributes respective attributes of nuisance defects comprised in the plurality, and wherein performing the comparison comprises comparing the stored-attributes with the second-possible-defect-attributes.

9. The method according to claim 1, wherein the first NAC is less than the second NAC, wherein performing the first inspection comprises performing multiple inspections of respective planes of the mask, wherein determining the first possible defect comprises determining one or more first possible defects and respective one or more first locations in response to the multiple inspections, and wherein performing the comparison comprises performing comparisons of the one or more first locations with the second location, and determining that the one or more first possible defects and the second possible defect represent the real defect if any one of the first locations match the second location.

10. The method according to claim 1, wherein performing the first inspection comprises illuminating the mask at a numerical aperture of illumination (NAI), and wherein the first NAC and the NAI are configured in response to respective numerical apertures of collection and illumination used to photolithograph a wafer with the mask.

11. The method according to claim 10, wherein a ratio NAI:NAC is equal to a ratio of the numerical apertures of illumination and collection used to photolithograph the wafer.

12. The method according to claim 10, wherein performing the second inspection comprises illuminating the mask at the NAI.

13. Apparatus for qualifying printability of a mask, comprising:
an optical assembly which is configured to perform a first inspection of the mask at a first numerical aperture of collection (NAC) of radiation from the mask, and to perform a second inspection of the mask at a second NAC, different from the first NAC; and
a processor which is arranged:
in response to the first inspection, to determine a first possible defect in the mask and a first location of the first possible defect,
in response to the second inspection, to determine a second possible defect in the mask and a second location of the second possible defect;
to perform a comparison of the first and second locations; and
in response to the comparison, to determine that the first and second possible defects represent a real defect if the first location matches the second location.

14. The apparatus according to claim 13, wherein the processor is arranged, in response to the comparison, to determine that the first and second possible defects represent a nuisance defect if the first location does not match the second location.

15. The apparatus according to claim 13, wherein the second NAC is less than the first NAC, wherein the first location does not match the second location, and wherein performing the second inspection comprises saving an image of the mask, the apparatus further comprising a workstation via which a human operator performs an analysis of the image at the first location and in response to the analysis determines that the first possible defect represents the real defect.

16. The apparatus according to claim 15, wherein performing the analysis comprises performing the analysis in real time.

17. The apparatus according to claim 15, wherein determining the second possible defect comprises determining a plurality of second possible defects, wherein the processor is arranged to determine an acceptable printability criterion for the mask at the second NAC in response to a noise level determined by the second NAC, so that a given fraction of the second possible defects at the noise level comprise real defects, and wherein performing the analysis comprises applying a printability criterion to the analysis corresponding to a smaller value than the given fraction.

18. The apparatus according to claim 17, wherein the real defect comprises a defect in an element of the mask, and wherein the acceptable printability criterion and the printability criterion comprise respective functions of a critical dimension of the element.

19. The apparatus according to claim 13, wherein the second NAC is less than the first NAC, wherein determining the second possible defect comprises determining a plurality of second possible defects and respective second locations of the plurality, and wherein performing the comparison of the first and second locations comprises performing respective comparisons between the first location and the respective second locations.

20. The apparatus according to claim 13, wherein the first NAC is smaller than the second NAC, wherein determining the second possible defect comprises determining second-possible-defect-attributes thereof, and also comprises determining a plurality of second possible defects and saving as stored-attributes respective attributes of nuisance defects comprised in the plurality, and wherein performing the comparison comprises comparing the stored-attributes with the second-possible-defect-attributes.

21. The apparatus according to claim 13, wherein the first NAC is less than the second NAC, wherein performing the first inspection comprises performing multiple inspections of respective planes of the mask, wherein determining the first possible defect comprises determining one or more first possible defects and respective one or more first locations in response to the multiple inspections, and wherein performing the comparison comprises performing comparisons of the one or more first locations with the second location, and determining that the one or more first possible defects and the second possible defect represent the real defect if any one of the first locations match the second location.

22. The apparatus according to claim 13, and comprising illumination optics, and wherein performing the first inspection comprises illuminating the mask with the illumination optics at a numerical aperture of illumination (NAI), and wherein the first NAC and the NAI are configured in response to respective numerical apertures of collection and illumination used to photolithograph a wafer with the mask.

23. The apparatus according to claim 22, wherein a ratio NAI:NAC is equal to a ratio of the numerical apertures of illumination and collection used to photolithograph the wafer.

24. The apparatus according to claim 22, wherein performing the second inspection comprises illuminating the mask with the illumination optics at the NAI.

* * * * *